United States Patent
Lee et al.

(10) Patent No.: US 12,454,285 B2
(45) Date of Patent: Oct. 28, 2025

(54) VEHICLE TRAJECTORY TREE STRUCTURE INCLUDING LEARNED TRAJECTORIES

(71) Applicant: Zoox, Inc., Foster City, CA (US)

(72) Inventors: Seungji Lee, San Carlos, CA (US); Gary Linscott, Seattle, WA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 223 days.

(21) Appl. No.: 18/204,097

(22) Filed: May 31, 2023

(65) Prior Publication Data

US 2024/0400095 A1    Dec. 5, 2024

(51) Int. Cl.
*B60W 60/00* (2020.01)
*B60W 40/06* (2012.01)
*G06N 20/00* (2019.01)

(52) U.S. Cl.
CPC ........ *B60W 60/0011* (2020.02); *B60W 40/06* (2013.01); *G06N 20/00* (2019.01); *B60W 2554/80* (2020.02)

(58) Field of Classification Search
None
See application file for complete search history.

(56) References Cited

U.S. PATENT DOCUMENTS

| 7,278,511 B1 * | 10/2007 | Gass ................... B62D 7/1509 180/409 |
| 10,649,459 B2 | 5/2020 | Wang et al. |
| 11,465,622 B2 * | 10/2022 | Lahti ................... B60W 30/146 |
| 2017/0061804 A1 * | 3/2017 | Navarro Felix ......... G08G 5/34 |
| 2019/0135278 A1 * | 5/2019 | Hillman ................. B60W 30/09 |

(Continued)

FOREIGN PATENT DOCUMENTS

| CN | 115123310 A | 9/2022 |
| EP | 3995782 A1 | 11/2022 |

OTHER PUBLICATIONS

PCT Search Report and Written Opinion Dated Sep. 10, 2024, for PCT Application No. PCT/US2024/029457, 12 pages.

(Continued)

*Primary Examiner* — Donald J Wallace
*Assistant Examiner* — Robert L Pinkerton
(74) *Attorney, Agent, or Firm* — Lee & Hayes, P.C.

(57) ABSTRACT

Techniques for generating a tree structure based on multiple machine-learned trajectories are described herein. A planning component ("ML system") within a vehicle may receive and encode various types of sensor and/or vehicle data. The ML system can provide the encoded data as input to multiple machine-learning models ("ML models"), each of which may be trained to output a unique candidate trajectory for the vehicle follow. In some examples, each ML model may be trained to output a unique type of learned trajectory that causes the vehicle to perform a certain type of action. Using the learned candidate trajectories, the ML system may generate a tree structure that includes some or all of the candidate trajectories. The vehicle may determine a control trajectory based on the generation and traversal of the tree structure using a tree search algorithm, and may follow the control trajectory within the environment.

20 Claims, 7 Drawing Sheets

(56) References Cited

U.S. PATENT DOCUMENTS

| | | |
|---|---|---|
| 2019/0204843 A1 | 7/2019 | Fang et al. |
| 2020/0117200 A1* | 4/2020 | Akella .............. B60W 30/0956 |
| 2020/0148201 A1* | 5/2020 | King ................ B60W 30/0956 |
| 2020/0366941 A1* | 11/2020 | Sugio ..................... H04N 19/96 |
| 2022/0185267 A1* | 6/2022 | Beller ............... B60W 30/0956 |
| 2023/0069215 A1 | 3/2023 | Chong et al. |
| 2023/0159056 A1 | 5/2023 | Cheng et al. |
| 2023/0177804 A1* | 6/2023 | Wuu .................... G06V 20/588 382/103 |
| 2024/0001937 A1* | 1/2024 | Liu ..................... B60W 40/107 |
| 2024/0182082 A1* | 6/2024 | Chen ............... B60W 60/00272 |

OTHER PUBLICATIONS

U.S. Appl. No. 17/855,088, filed Jun. 30, 2022, Schleede, et al., "Machine-Learned Component for Vehicle Trajectory Generation", 57 pages.

U.S. Appl. No. 17/900,658, filed Aug. 31, 2022, Caldwell, et al., "Trajectory Prediction Based on a Decision Tree", 49 pages.

U.S. Appl. No. 18/072,015, filed Nov. 30, 2022, Narayanan, et al., "Vehicle Trajectory Tree Search for Off-Route Driving Maneuvers" 66 pages.

\* cited by examiner

VEHICLE TRAJECTORY TREE STRUCTURE INCLUDING LEARNED TRAJECTORIES

BACKGROUND

Vehicles are increasingly supplementing or replacing manual functionality with automatic controls. Autonomous driving functionality such as trajectory planning and vehicle navigation may benefit from on-board computing systems capable of making split-second decisions to respond to myriad events and scenarios, including determining trajectories through environments and reactions of the vehicle to dynamic objects and events in the environment. Certain autonomous vehicle systems may use rules-based approaches to determining trajectories and reacting to dynamic events in environments. A rules-based approach may use a combination of hand-engineered driving rules and/or loss minimization functions to determine a trajectory for the vehicle to follow in various driving scenarios. However, rules-based approaches for vehicle navigation can be expensive to hand engineer and often scale poorly to new geographies, driving scenarios, and environments, in addition to the fact that the heuristics may not provide ideal driving behavior in all scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
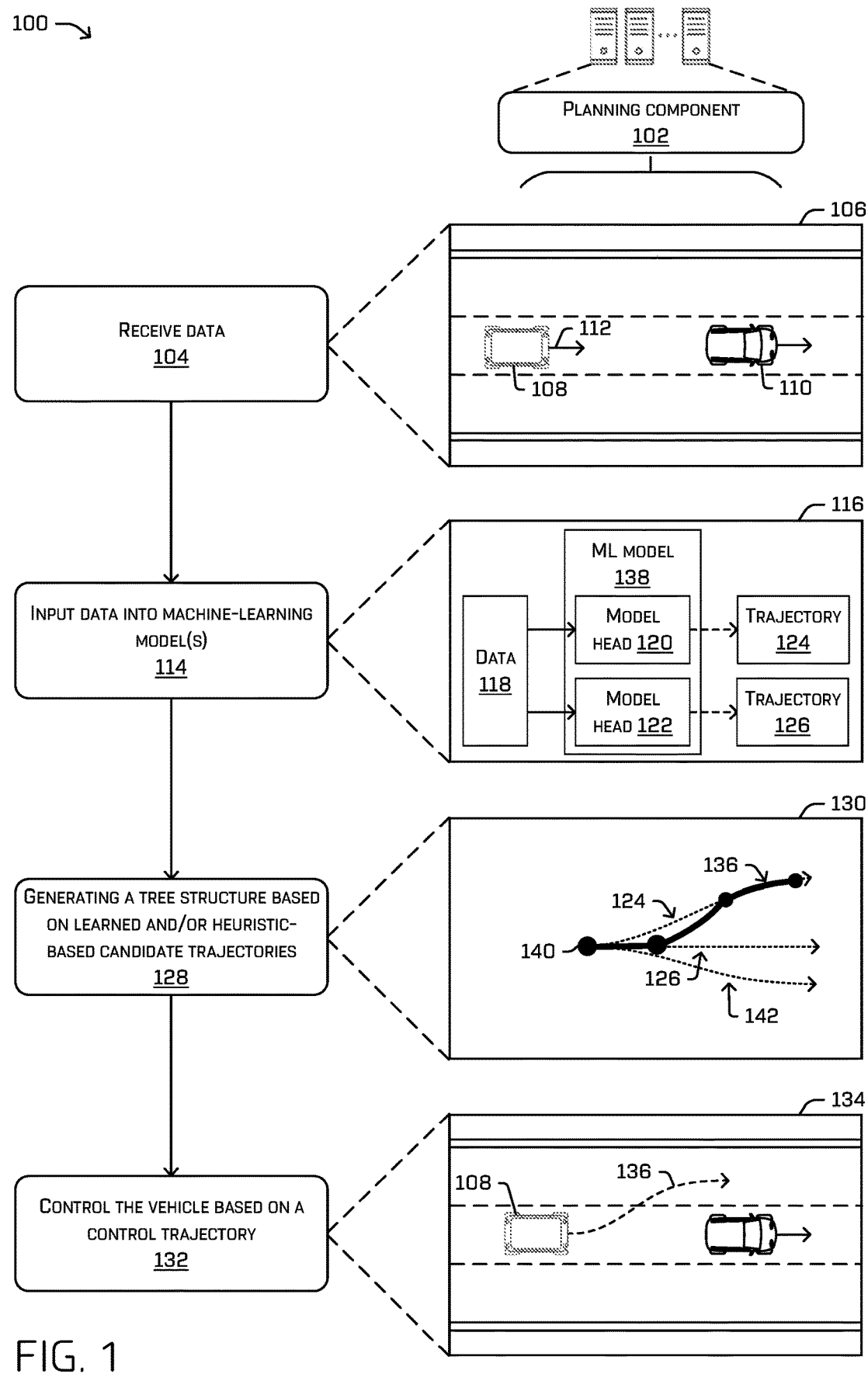
FIG. 1 is a pictorial flow diagram illustrating an example technique for inputting a diverse set of machine-learned trajectories into a tree structure which can be used to determine a control trajectory for the vehicle to follow, in accordance with one or more examples of the disclosure.

As described above, rule-based approaches for vehicle navigation can be computationally expensive and may scale poorly to new geographies, driving scenarios, and environments. Accordingly, techniques for generating a tree structure based on machine-learned trajectories are described herein. In some instances, one or more machine-learning models may be used to output a diverse set of candidate trajectories to generate a tree structure. In some examples, a planning component (hereinafter "ML system") integrated within a vehicle (such as an autonomous vehicle) may receive and/or encode various types of data (e.g., vehicle state data, object features, road features, etc.). The ML system can provide the various types of data as input to one or more machine-learning models (hereinafter "ML models"). In some examples, the ML model(s) may be trained to output one or more unique candidate trajectories for the vehicle to follow. That is, the ML model(s) may be trained to output one or more learned trajectories that are unique in type and cause the vehicle to perform a certain type of action (e.g., lane change left, lane change right, increased assertiveness, increased passiveness, nominal trajectory, etc.). Using the candidate learned trajectories, the ML system may generate a tree structure based on some or all of the candidate trajectories. In such cases, the vehicle may determine a control trajectory based on the generation of the tree structure. The vehicle may follow the control trajectory while operating within the environment. As discussed throughout this disclosure, the techniques described herein may improve vehicle safety and/or driving efficiency by determining improved driving trajectories through the environment by increasing the proportion of learned trajectories to heuristic-based trajectories in a tree structure, thereby reducing computations expenses when determining a control trajectory for the vehicle to follow.

When determining a control trajectory for the vehicle to follow, conventional systems and/or techniques may be computationally expensive and/or inefficient. For example, while traversing an environment, a vehicle can generate multiple heuristic-based candidate trajectories (e.g., 50, 70, 100, 1000, etc.). Such trajectories may be unaware of the object(s) in the environment. In addition, the vehicle may generate a single learned candidate trajectory which can be used in addition to the heuristic-based trajectories. In such examples, the candidate trajectories can be used to determine a control trajectory for the vehicle to follow. For instance, the vehicle can generate a tree structure based on some or all the candidate trajectories. While generating the tree structure, the vehicle may apply an optimization algorithm, such as tree search and/or tree traversal algorithm, during which the various candidate trajectories are evaluated to determine the control trajectory as an optimal or lowest-cost trajectory for the vehicle to follow. To ensure that the vehicle has a diverse set of viable trajectory options, the vehicle must generate large numbers of heuristic-based trajectories, as some of the heuristic-based trajectories may be invalid. However, analyzing such a large volume of trajectories is computationally expensive and inefficient. Consequently, the limitations to the conventional techniques may result in evaluating large amounts of heuristic-based trajectories, thereby resulting in excessive computational expenses.

To address these and other technical problems and inefficiencies, the systems and/or techniques described herein include an ML system and/or planning component (which also may be referred to as an "ML component" or "ML management component") configured to provide a diverse set of machine-learned trajectories to the tree structure. Further, the ML system may leverage the multiple learned candidate trajectories to allow the vehicle to limit the number of needed heuristic-based trajectories. Increasing the number of machine-learned trajectories in the tree structure and lessening the number of heuristic-based trajectories in the tree structure can reduce the computational expense. Technical solutions discussed herein solve one or more technical problems associated with spending excessive amounts of compute resources to determine a control trajectory for the vehicle to follow.

Initially, an ML system may receive various types of data from one or more components of a vehicle. In some examples, the ML system may receive data relating to the vehicle mission. Specifically, the vehicle mission may indicate the start location(s), the end location(s) (e.g., destination location(s)), number of passengers, and/or any other data. Further, the ML system may receive data relating to the state of the vehicle. State information may include location data, pose data, velocity data, acceleration data, steering angle, yaw rates, and/or any other data. Additionally, the ML system can receive data from the perception and/or prediction systems. Specifically, the ML system may receive data representing one or more objects and the object's associated information and/or characteristics (e.g., object pose, object type, object velocity, object acceleration, etc.). In some examples, the ML system may also receive road feature information (e.g., number of lanes, type of lane, road signage, width of lane, etc.).

In some examples, the ML system may provide the various types of data as input to one or more ML models trained to output encoding(s) of the data. The ML system may encode the data and input such encoded data into one or more different ML models trained to output the learned trajectories. For example, the system may input some or all the data into a single encoder configured to encode the data. Alternatively or additionally, the ML system may input each type of data into a corresponding encoder configured to encode the corresponding type of data. Such encoders may be a transformer model, a residual network (i.e., ResNet) model, and/or any other type of model. Example techniques for encoding data can be found, for example, in U.S. application Ser. No. 17/855,088, filed Jun. 30, 2022, and titled "Machine-Learned Component for Vehicle Trajectory Generation", as well as in U.S. application Ser. No. 18/072,015, filed Nov. 30, 2022, and titled "Vehicle Trajectory Tree Search for Off-Route Driving Maneuvers" the contents of which is herein incorporated by reference in its entirety and for all purposes. Upon encoding the various types of data, the ML system may input the encoded data into one or more ML models (e.g., Long Short-term Memory Networks ("LSTM") and/or other forms of recurrent neural networks, or other form of network) trained to output unique candidate trajectories for the vehicle to follow. For instance, the ML system may input the same or similar encoded data into the ML model(s). Further, the ML model(s) may be trained to output a specific type of trajectory that causes the vehicle to perform a certain type of action.

In some examples, the ML system may use mixture of experts ML technique to ensure that the ML model(s) are trained to output unique candidate trajectories. A mixture of experts technique includes using an ML model that includes multiple output heads (e.g., copies and/or versions of the model architecture) trained to output a diverse set of candidate trajectories. Specifically, the mixture of experts approach may result in different model heads being trained to output different types of trajectories that cause the vehicle to perform different actions. For instance, one model head may output left lane change trajectories, another model head may output a right lane change trajectories, while a different model head may output a passive trajectory. Furthermore, usage of such techniques ensures that not all outputs are similar. In various examples, it may be important to ensure wide parameter exploration (e.g., trajectories which vary more than a threshold amount from one another) to ensure a tree search based upon such trajectories considers all possible likely paths. If the multiple trajectories were all similar (i.e., within some threshold of one another), the net result would be increased computational resource requirements without a corresponding increase in the most likely actions to be taken. Specifically, when evaluating the diversity of the candidate trajectories, the ML system may measure the differences of velocities, accelerations, steering angles, and/or poses between two or more candidate trajectories. The larger the difference between such values may indicate that there is a larger diversity within the set of candidate trajectories.

In some examples, the ML models and/or model heads may be trained by initializing the individual models and/or model heads by assigning random weights to each of the models and/or model heads. In such instances, the ML models and/or model heads may each be assigned a different random weight. Further, the ML models and/or model heads may receive log data (e.g., data from previous driving experiences) and are trained to output a predicted trajectory based on such data. The log data may include the vehicle mission data, object data, road feature data, and/or an actual trajectory followed by the vehicle. In some examples, during a training stage, the ML system or any other component may determine the actual trajectory followed by the vehicle from the ground truth data, and compare the actual trajectory of the vehicle to the predicted trajectories output by the ML models. The ML system may adjust the weights to minimize the loss from a loss function. Based on the ML models and/or model heads being initialized with a different random weights, some predicted trajectories may more closely align with the actual trajectory than other predicted trajectories. As such, the ML system may adjust the weights differently for each ML model and/or model head. In various examples, any loss function (or combination of loss functions) may be used to calculate a loss value associated with the predicted trajectory. Such loss functions may include, for example, L1 loss functions (e.g., Least Absolute Deviations) and/or L2 loss functions (e.g., Least Square Errors). As the ML model(s) and/or model heads are trained and the weights are modified in different ways according to the loss, such ML model(s) and/or model heads may be trained to output different types of trajectories. That is, some or all of the ML model(s) and/or model heads may output different trajectories from one another. Additionally or alternatively, to increase diversity between the output candidate trajectories, the ML system can cause certain ML models and/or model heads to output specific types of trajectories. For instance, the ML system may determine that a specific model head is to be trained to output left lane change trajectories. In such instances, a different model head may be trained to output a right lane change trajectory, another different model head may be trained to output a reduced-speed-in-lane trajectory, another different model head may be trained to output a speed-up-in-lane trajectory, and/or any other type of trajectory. As such, for a left lane change trajectory, when comparing the predicted trajectory to the actual trajectory, the ML system may adjust the actual trajectory to align more closely with a left lane change. Of course, though discussed herein as multiple ML models, the disclosure is not meant to be so limiting. Indeed, any one single model may have multiple heads such that multiple trajectories are output.

In some examples, the ML system may receive a probability corresponding to the candidate trajectory. For example, the ML system and/or ML model may determine a probability or rank corresponding to some or all of the candidate trajectories received from the ML models. The probability may represent how likely the candidate trajectory is to be selected or otherwise used by the vehicle. In some examples, the probability may be determined based on the data input to the ML models. For instance, the ML system may determine the probability based on the state of the vehicle, the object(s) located within the environment, the predicted data associated with the object(s), the mission goal for the vehicle, and/or any other factors. For example, if the data indicates that there is a double-parked vehicle located within the vehicle's path, the ML system may indicate that candidate trajectories which change lanes, stop, or pass the double-parked vehicle have a higher probability of being used than a trajectory that instructs the vehicle to continue within the same lane. Conversely, if the data indicates that there are no objects located in the lane within which the vehicle is located, the ML system may indicate that the nominal trajectory that instructs the vehicle to continue in the same lane has a higher probability than candidate trajectories that cause the vehicle to change lanes. Alternatively or additionally, the ML system may determine the probabilities for the candidate trajectories based on inputting the candidate trajectories into one or more ML models trained to output probabilities. Further, the ML system may use heuristics to determine the probability corresponding to the candidate trajectories.

In some examples, the ML system may receive machine-learned trajectories from the ML model(s) and/or model heads. The ML system may receive a diverse set of learned candidate trajectories. The diverse set of candidate trajectories may include a nominal trajectory (e.g., default trajectory; proceed in the same lane), a left lane change trajectory, a right lane change trajectory, a passing trajectory, an aggressive trajectory, a passive trajectory, a combination of the various types of trajectories, and/or any other type of trajectory. In some examples, determining such trajectories may include modifying one or more navigational constraints and/or policies of the vehicle. For instance, an aggressive candidate trajectory may include altering one or more of the navigational constraints and/or policies of the vehicle.

In some examples, the ML system may determine whether the candidate trajectories satisfy a condition. The ML system may send candidate trajectories to be included in a tree search (e.g., tree structure) based on such candidate trajectories satisfying the condition. The condition may be a probability threshold for the probability of the candidate trajectory to meet or exceed. As such, the ML system may determine whether the candidate trajectory satisfies the condition by determining whether the probability of the candidate trajectory meets or exceeds a threshold value. Filtering candidate trajectories based on probabilities may reduce the number of low-quality candidate trajectories in the tree structure while increasing the quality of trajectories in the tree structure, thereby reducing the computational expenses. Of course, this is merely an example, and in other examples candidate trajectories may be included in the tree structure without satisfying a condition.

In some examples, the vehicle may generate a tree structure that includes some or all of the candidate trajectories. A tree structure may include one or more nodes representing vehicle states at different action layers of the tree structure. Further, each vehicle state may include multiple candidate trajectories which the vehicle may follow. In some examples, some or all of the candidate trajectories in the tree structure may be received from the ML system. Alternatively or additionally, some candidate trajectories in the tree structure may be heuristic-based trajectories generated by one or more components of the vehicle. As such, in some examples the tree structure may include a combination of learned and heuristic-based candidate trajectories.

In some examples, the vehicle can determine a control trajectory based on the tree structure. The vehicle can evaluate some or all of the candidate trajectories at each node when determining a control trajectory. A solution to the tree may result in a series of nodes of the one of more candidate trajectories which, when traversed (e.g., moving along and between differing trajectories), results in an output trajectory having a lowest determined overall cost. An overall cost for the output (e.g., control trajectory) trajectory may represent and/or be indicative of the combination of one or more sub-costs. A cost value can indicate the safety, risk, convenience, and/or efficiency of a candidate trajectory. For instance, a high cost value may indicate heightened degree of risk, danger, inconvenience, and/or inefficiency of the trajectory. In contrast, low cost values may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs, progress costs, debris cost, an exit cost, an approach cost, a space cost, a payment cost, a yaw cost, and/or any other type of cost. In various examples, differing costs types may be associated with differing weights based on, for example, importance. As a non-limiting examples, a safety cost may be associated with a higher weight than a comfort cost. In such instances, the planning component may combine the various costs into a single overall cost. Such costs may be weighted differently, and as such, different costs may affect the overall cost in different proportions. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment.

As illustrated by these examples, the techniques described herein can improve systems and processes of the autonomous and semi-autonomous vehicles operating in various driving environments. Using one or more ML models to generate object-aware candidate trajectories can significantly reduce the amount of computational resources used when determining a control trajectory. Specifically, increasing the number of learned trajectories in the tree search can enable the vehicle to generate less heuristic-based trajectories. Accordingly, instead of generating one hundred heuristic-based (e.g., object-unaware) candidate trajectories, the vehicle can generate 10 (e.g., 5, 15, 20, 100, etc.) learned trajectories. Reducing the number of candidate trajectories in the tree search can increase computational efficiency by reducing the number of candidate trajectories the vehicle evaluates. The improved computation efficiency can increase computing speeds which may enable the vehicle to determine control trajectories sooner, thereby enabling the vehicle to follow such trajectories sooner. For instance, if the planner component has to evaluate 100 heuristic-based candidate trajectories at each leaf node, exploring the branches of the tree structure up to a depth of six leaf nodes becomes $100^6$ traversals to evaluate. Such a large number of traversals requires large amounts of compute resources. However, based on the current techniques enabling the planning component to reduce the number of heuristic-based trajectories, if the planner component has to evaluate 10 learned candidate trajectories at each leaf node to a depth of six nodes, this becomes $10^6$ which significantly reduces the amount of compute required to determine control trajectory.

The techniques described herein can be implemented in a number of ways. Example implementations are provided below with reference to the following figures. Example implementations are discussed below in which the vehicles are implemented as autonomous vehicles. However, the methods, apparatuses, and systems described herein can be applied to fully or partially autonomous vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in aviation or nautical contexts. Additionally, the techniques described herein may be used with real data (e.g., captured using sensor(s)), simulated data (e.g., generated by a simulator), or any combination of the two.

FIG. 1 is a pictorial flow diagram illustrating an example process 100 for inputting a diverse set of machine-learned trajectories into a tree structure which can be used to determine a control trajectory for the vehicle to follow. As shown in this example, some or all of the operations in the example process 100 may be performed by a planning component 102 integrated within a perception component, a prediction component, a planning component, and/or other components and systems within an autonomous vehicle. For instance, as shown in this example, example process 100 may be implemented using a planning component 102. As described below in more detail, the planning component 102 may include various components, such as an encoder component, a machine-learning model component, and/or a tree structure component which may be configured to determine a control trajectory for the vehicle to follow.

At operation 104, the planning component 102 may receive data from various components of the vehicle. In some examples, the types of data may include vehicle mission data, state data, object data, road feature data, and/or any other type of data. For example, box 106 illustrates an autonomous vehicle 108 navigating an environment behind an object 110. In this example, the vehicle 108 may be navigating in a center lane of a three-lane road. Further, the vehicle 108 may following a trajectory 112 which instructs the vehicle 108 to remain in the center lane. In some examples, the vehicle 108 may use one or more sensor devices (e.g., radar, lidar, time-of-flight, image capturing, etc.) mounted at various locations to capture sensor data of the environment. Upon capturing such sensor data, the vehicle 108 may send the sensor data to one or more perception components configured to detect and/or classify object(s) within the environment and to one or more prediction components configured to predict object information and/or characteristics. The data from the perception and/or prediction components may be sent to the planning component 102 for further processing. In this example, the planning component 102 may receive data identifying the object 110 within the environment. As shown, the object 110 may be a vehicle; however, in other examples, the object may be a pedestrian, animal, cyclist, or any other type of object. Further, in other examples there may be more or less objects within the environment.

At operation 114, the planning component 102 may input the data into one or more ML models. In some examples, the planning component 102 may encode the data received at operation 104. Further, the planning component 102 may input the encoded data into one or more ML models trained to output a diverse set of candidate trajectories. For example, box 116 depicts the planning component 102 inputting the data into an ML model with multiple model heads. In this example, the box 116 may include data 118 which corresponds to the data received at operation 104. Further, box 116 includes an ML model 138 which includes a first model head 120 and a second model head 122. Such model heads may be copes and/or versions of the ML model 138 architecture. In some examples, the first model head 120 and the second model head 122 may be LSTM models; however, in other examples the first and second model heads may be any other type of model. As shown in box 116, the planning component 102 may input the same or similar data 118 into the ML model 138 which will then input the encoded data to both the first model head 120 and the second model head 122. In this example, the first model head 120 may be trained to output a first candidate trajectory 124 and the second model head 122 may be trained to output a second candidate trajectory 126. Though depicted as including two model heads, in other examples the planning component may include more or less model heads configured to output any type of candidate trajectory. Additionally or alternatively, in other examples there may be more than one ML model to which the data is input. Additional details for encoding data, inputting the data into the ML models, and/or receiving candidate trajectories are described with respect to FIGS. 2 and 3.

At operation 128, the planning component 102 may generate a tree structure based on the learned candidate trajectories and/or heuristic-based candidate trajectories. The planning component 102 may receive a diverse set of learned candidate trajectories. The diverse set of candidate trajectories may include a nominal trajectory (e.g., default trajectory; proceed in the same lane), a left lane change trajectory, a right lane change trajectory, a passing trajectory, an aggressive trajectory, a passive trajectory, and/or any other type of trajectory. Further, the planning component may also receive one or more heuristic-based candidate trajectories. For example, box 130 illustrates an example tree structure which includes learned and heuristic-based candidate trajectories. In this example, the tree structure may nodes representing the current or predicted state of the vehicle at that location. Specifically, the initial node 140 may represent the initial state of the vehicle 108 at the current moment. The tree structure illustrates three more leaf nodes along the candidate trajectories. However, this is not intended to be limiting, in other examples there may be more or less nodes at varying distances from one anther. The box 130 also includes the first candidate trajectory 124 received from the first model head 120, the second candidate trajectory received from the second model head 122, and a heuristic candidate trajectory 142 received from one or more other components of the vehicle 108. As shown, the box 130 illustrates a control trajectory 136 that, when traversed, has the lowest overall cost. Specifically, at the initial node 140, the planning component 102 may determine a cost for each of the candidate trajectories. Upon determining that the second candidate trajectory 126 has the lowest cost, the planning component may determine that the portion of the second candidate trajectory 126 between the initial node 140 and the second node is part of the control trajectory 136. Further, upon reaching the second node, the planning component 102 may determine, from the second node, which candidate trajectory has the lowest cost. In this example, the planning component 102 may determine that the first candidate trajectory 124 has the lowest cost value, and as such, the planner may transition from the second candidate trajectory 126 to the first candidate trajectory 124. At the third node, the planning component 102 may perform similar operations to those described above; specifically, determining which candidate trajectory has the lowest cost from the third node. In this example, the planning component 102 may determine that the first candidate trajectory 124 has the lowest cost, and as such, may include such portions of the trajectory in the control trajectory 136. As noted above, the planning component 102 may perform such operations to determine the control trajectory 136.

At operation 132, the planning component 102 may control the vehicle based on a control trajectory. For example, box 134 illustrates the vehicle following a control trajectory 136. In this example, the control trajectory 136 may similar or identical to the second candidate trajectory 126 illustrated in box 130. Accordingly, the vehicle 108 may be instructed to navigate from the center lane to the left-adjacent lane. Additional details for the tree structure and determining a control trajectory are described with respect to FIGS. 2, 4A, and 4B.

Figure 2:
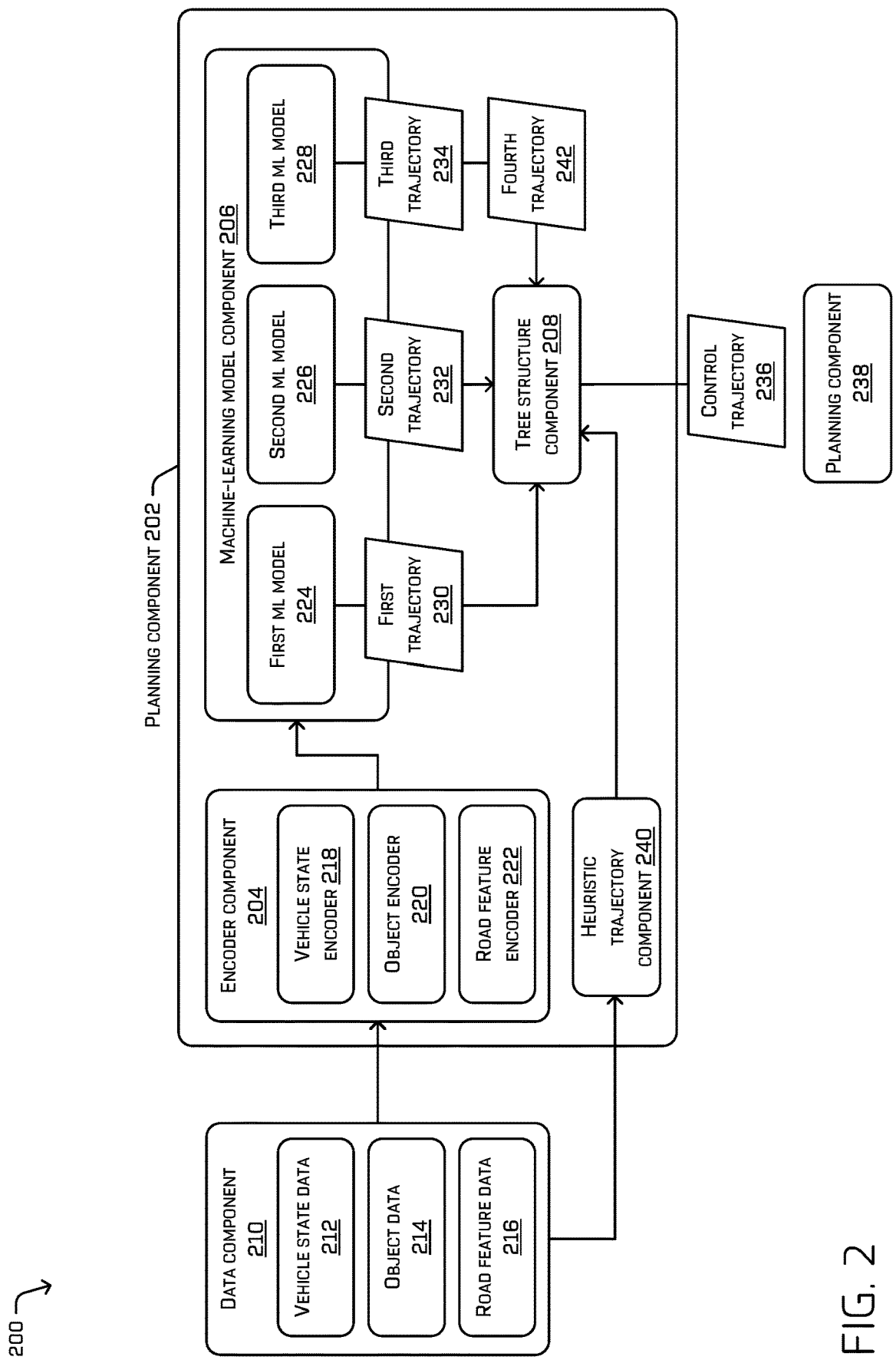
FIG. 2 illustrates an example computing system including a planning component configured to generate multiple machine-learned trajectories to be used in a tree structure, in accordance with one or more examples of the disclosure.

FIG. 2 illustrates an example computing system including a planning component configured to generate multiple machine-learned trajectories to be used in a tree structure.

In some examples, the planning component 202 may be similar or identical to the planning component 102 described above, or in any other examples herein. As noted above, in some cases the planning component 202 may be implemented within or otherwise associated with a perception component, a prediction component, and/or a planning component of an autonomous vehicle. In some examples, the planning component 202 may include various components, described below, configured to perform different functionalities of a trajectory determining technique. In some examples, some or all of the subcomponents of the planning component 202 may be integrated in a remote server-based system while other subcomponents may be integrated in on-vehicle systems. In some examples, the planning component 202 may include an encoder component 204 configured to encode various types of data, a machine-learning model component 206 configured to output a diverse set of candidate trajectories, a heuristic trajectory component 240 configured to output heuristic-based candidate trajectories, and/or a tree structure component 208 configured to determine a control trajectory based on the candidate trajectories.

In some examples, the planning component 202 may receive various types of data from one or more components of the autonomous vehicle. In some examples, a data component 210 may include vehicle state data 212, object data 214, and/or road feature data 216. Of course in other examples the data component 210 may include more of less types of data. The data component 210 may include data identified by one or more of a perception system, a prediction system, or a planning system. The data component 210 may be configured to receive, store, synchronize, and/or analyze the various types of data. As shown in this example, the encoder component 204 of the planning component 202 may receive the data stored within the data component 210.

In this example, the encoder component 204 may include one or more encoders configured to encode different types of data. As shown, the encoder component 204 may include a vehicle state encoder 218, an object encoder 220, and a road feature encoder 222. As noted above, the encoders may be a transformer model, a residual network, and/or any other type of model. In this example, the vehicle state encoder 218 may receive and/or encode the vehicle state data 212 from the data component 210, the object encoder 220 may receive and/or encode the object data 214 from the data component 210, and the road feature encoder 222 may receive and/or encode the road feature data 216 from the data component 210. Though shown in this example that there is a single encoder for each type of data, in other examples the encoder component 204 may include a one or more encoders configured to encode some or all of the data in the data component 210. As shown, the encoder component 204 may send the encoded data to the machine-learning model component 206. In some examples, such encoded data may be the concatenation (or other representation) of the output of the various encoders illustrated within the encoder component 204.

In some examples, the planning component 202 may include a machine-learning model component 206 configured to output a diverse set of candidate trajectories. As shown in FIG. 2 the machine-learning model component 206 may receive encoded data from the encoder component 204. The machine-learning model component 206 may include multiple subcomponents. Such subcomponents may include multiple ML models trained to output candidate trajectories and/or comprise diverse heads, outputs, etc. of a single model. In some examples, the machine-learning model component 206 may include a first ML model 224, a second ML model 226, and a third ML model 228. The first, second, and third ML models may receive similar or identical encoded data. Based on receiving such data, the first ML model 224 may output a first trajectory 230, the second ML model 226 may output a second trajectory 232, and the third ML model 228 may output a third trajectory 234 and a fourth trajectory 242. However, this example is not intended to be limiting, in other examples, the machine-learning model component 206 may include more or less ML models. Further, in other examples the ML models may include one or more model heads trained to output one or more candidate trajectories. In this example, the machine-learning model component 206 may send the first trajectory 230, the second trajectory 232, the third trajectory 234, and the fourth trajectory 242 to a tree structure component 208.

In some examples, the planning component 202 may include a heuristic trajectory component 240 configured to generate one or more heuristic-based candidate trajectories. As shown, the heuristic trajectory component 240 may receive data from the data component 210. In such instances, the heuristic trajectory component 240 may use such data to determine a one or more candidate trajectories for the vehicle to follow. Heuristic-based candidate trajectories may be generated based on fixed rules regarding velocity, steering angle, acceleration, etc. The heuristic trajectory component 240 may generate and send one or more heuristic-based candidate trajectories to the tree structure component 208.

In some examples, the planning component 202 may include a tree structure component 208 configured to determine a control trajectory 236 based on the candidate trajectories received from the machine-learning model component 206 and/or the heuristic trajectory component 240. The tree structure component 208 may generate a tree structure using the first trajectory 230, the second trajectory 232, the third trajectory 234, the fourth trajectory 242, and/or any other trajectory generated by the heuristic trajectory component

240. The purpose of the tree structure is to enable the vehicle to evaluate the candidate trajectories at each state of the vehicle and to determine a control trajectory 236 for the vehicle to follow based on such candidate trajectories. The tree structure may include an initial node (e.g., root node) which represents the state of the vehicle. The first trajectory 230, the second trajectory 232, the third trajectory 234, and the fourth trajectory 242 may extend from the initial node. In such instances, the tree structure component 208 may determine a traversal path based on the candidate trajectories that results in the traversal path having a lowest determined overall cost. Based on identifying a traversal path (e.g., control trajectory) with the lowest overall cost, the tree structure component 208 may determine that such a traversal path may be the control trajectory 236 for the vehicle to follow. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree", the contents of which is herein incorporated by reference in its entirety and for all purposes. The tree structure component 208 may send the control trajectory 236 to a planning component 238. In such instances, the planning component 238 may use the control trajectory 236 by causing the vehicle to follow the control trajectory 236 throughout the environment.

Figure 3:
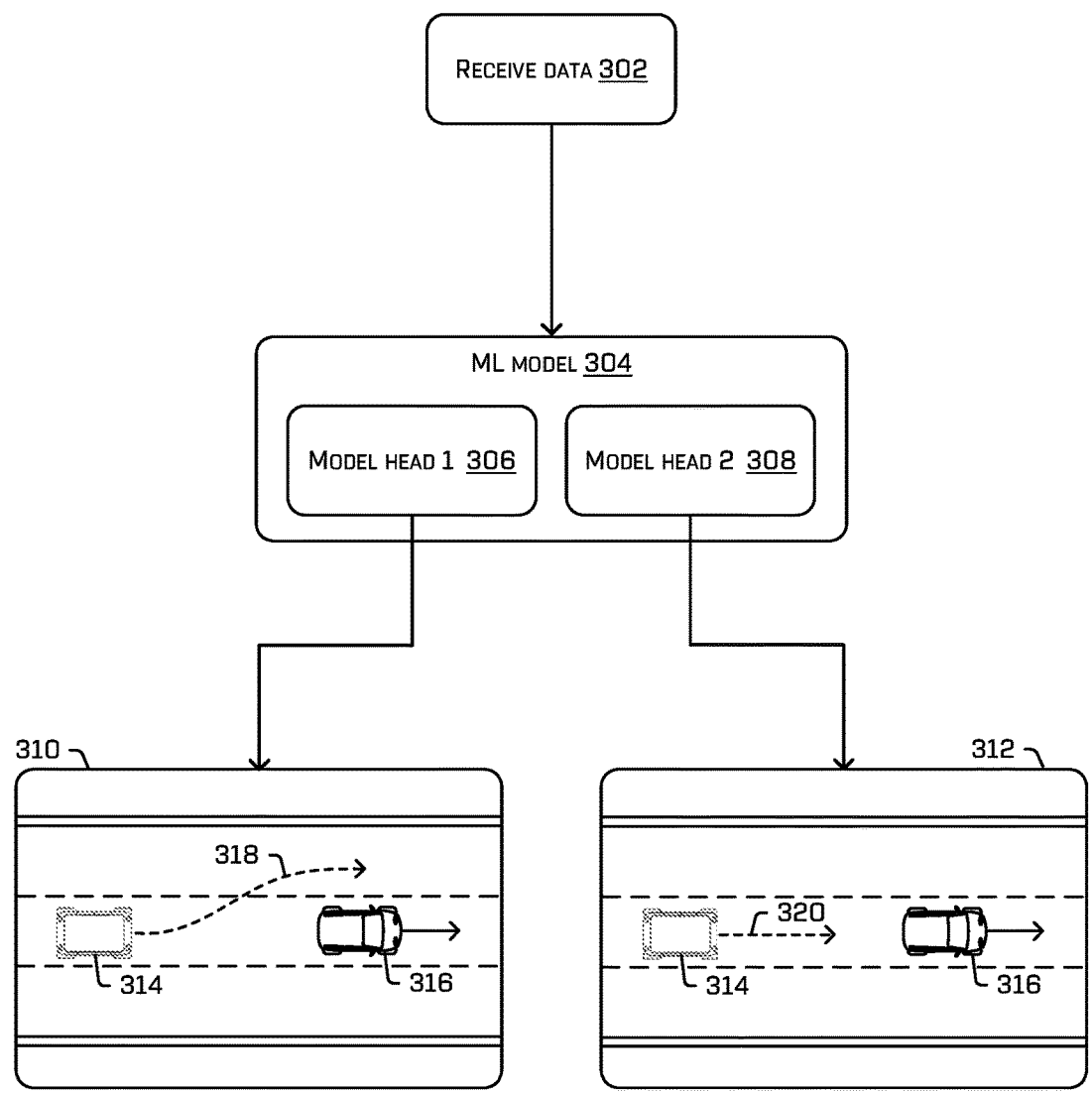
FIG. 3 is a pictorial flow diagram illustrating an example technique for inputting data into multiple machine-learning models and receiving learned trajectories from the models, in accordance with one or more examples of the disclosure.

FIG. 3 is a pictorial flow diagram illustrating an example process 300 for inputting data into multiple machine-learning models and receiving a learned trajectory from each of the models.

In this example, the example process 300 may include receiving data 302 from one or more components of the autonomous vehicle. In some examples, an ML system may receive various types of data, such as vehicle mission data, state data, object data, road feature data, and/or any other type of data. The ML system may input the various types of data into a ML model 304. In some examples, the ML model 304 may be similar or identical to the ML models described above and throughout. The ML model 304 may include multiple model heads that are trained to output candidate trajectories. Specifically, the ML model 304 may include a first model head 306 and a second model head 308. Of course, in other examples there may be more or less ML models and/or model heads within the ML model 304 trained to output unique candidate trajectories. In this example, the first model head 306 and the second model head 308 may receive similar or identical data 302. The first and second model heads may output unique candidate trajectories.

In some examples, the ML system may receive a first candidate trajectory from the first model head and a second candidate trajectory from the second model head. For example, FIG. 3 includes an example environment 310 and an example environment 312 that illustrate the candidate trajectories. In this example, the example environment 310 and the example environment 312 may be a same or similar environment. The example environment 310 may include a vehicle 314 and an object 316. In this example, the object 316 may be a vehicle; however, in other examples the object may be any other type of object. Further, the example environment 310 may illustrate a first candidate trajectory 318 that was output by the first model head 306. The first candidate trajectory 318 may instruct the vehicle 314 to change lanes to an adjacent left lane. Additionally, the example environment 312 may also include the vehicle 314 and the object 316. The example environment 312 may illustrate a second candidate trajectory 320 that was output by the second model head 308. The second candidate trajectory 320 may be a nominal trajectory that instructs the vehicle to remain within the center lane behind the object 316.

In some examples, the ML system may use the first candidate trajectory 318 and the second candidate trajectory 320 to generate a tree structure which may be used to determine a control trajectory for the vehicle to follow.

Figure 4A:
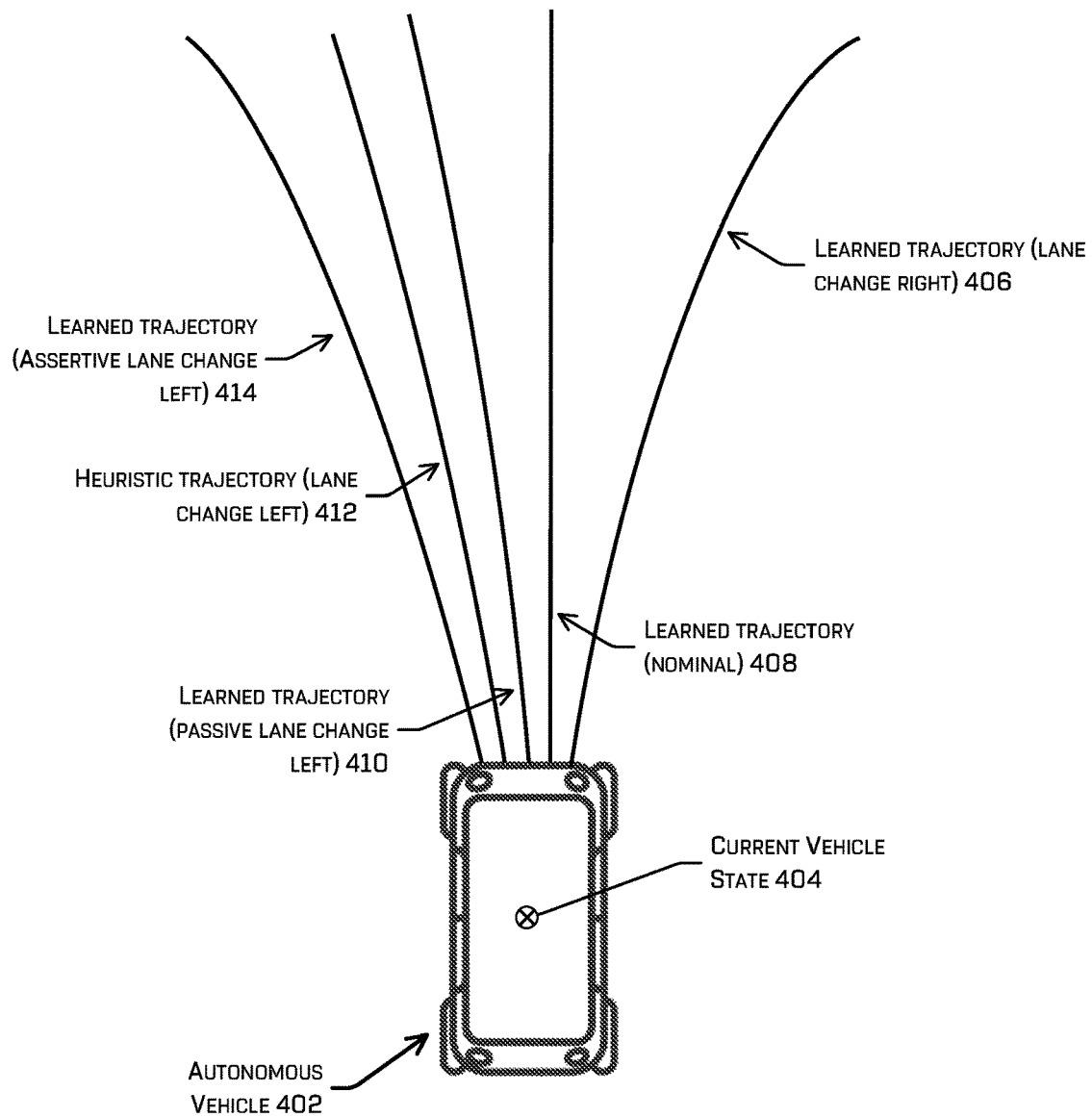
FIG. 4A illustrates an example representation of a set of candidate trajectories generated for a node in a tree search, in accordance with one or more examples of the disclosure.

FIG. 4A illustrates an example representation 400 of a set of candidate trajectories for an autonomous vehicle 402. In this example, the autonomous vehicle 402 is depicted at a current vehicle state 404, which may represent a node in a tree structure used to determine a control trajectory. The vehicle state 404 may include a set of parameters associated with a state of the autonomous vehicle 402, including the vehicle's position, pose, velocity, steering angle, and/or yaw rate. In some examples, the vehicle state 404 may represent a current state of the autonomous vehicle 402 and may correspond to the root node of the tree search. However, in other examples, the vehicle state 404 need not be the current state of the autonomous vehicle 402, but may represent a predicted future state of the vehicle, corresponding to a non-root node further down the tree structure toward the end state of the driving route.

In this example, candidate trajectories 406-414 are shown representing different trajectories that the vehicle may perform from the vehicle state 404. For instance, candidate trajectories 406-414 may be associated with a vehicle speed, velocity, steering angle, and/or other vehicle trajectory parameters. In some cases, a candidate trajectories also may include commands for activating emitters of the vehicle (e.g., turn signal, headlights, horn, speaker, etc.) and/or any other vehicle control command. The candidate trajectories 406-414 are depicted graphically in this example, each representing a trajectory that the autonomous vehicle 402 may follow from the vehicle state 404. In some examples, candidate trajectories 406-414 may be generated and stored as absolute parameter values (e.g., velocities, steering angles, etc.) while in other cases the generated and stored relative to the parameters of the vehicle state 404 (e.g., a velocity difference, a steering angle difference, etc.).

As described above, each of the candidate trajectories 406-414 can be used by a planning component of the autonomous vehicle 402 to determine a future state of the autonomous vehicle 402 that may result from the vehicle performing the candidate trajectory. In other examples, the planning component may use similar or identical techniques to generate a number of candidate vehicle states (e.g., rather than candidate actions). Each of the candidate trajectory 406-414 may include general driving commands and/or fine instructions for performing driving maneuvers, such as velocities or velocity changes, steering angles or steering angle changes, etc.

In this example, candidate trajectories 406 is a machine-learned candidate trajectory output by an ML system. As described above, the candidate trajectory 406 may represent an action determined by a controller of the planning component or the ML system to track the lane reference trajectory the includes the target state. The controller or ML system may determine the candidate trajectory 406 as an action (e.g., velocity, steering angle, etc.) that may attempt to instruct the vehicle to move from a current lane to an adjacent right lane. Candidate trajectory 408 is a machine-learned candidate trajectory determined by the ML system. The candidate trajectory 408 may be a nominal candidate trajectory that instructs the vehicle to remain within the current lane. Candidate trajectory 410 is a machine-learned candidate trajectory determined by the ML system. The candidate trajectory 410 may be a passive left lane change trajectory that instructs the vehicle to change lanes with a limited velocity, acceleration, steering angle, or by modifying one or more of the navigational constraints or policies. Candidate trajectory 412 is a heuristic-based trajectory determined by one or more components of the planning component. The candidate trajectory 412 may be a left lane change trajectory. Candidate trajectory 414 is a machine-learned trajectory determined by the ML system. Candidate trajectory 414 may be an assertive left lane change trajectory that instructs the vehicle to change from the current lane to a lane to the left while at a higher velocity or acceleration.

As noted above, although this example depicts a set of candidate trajectories 406-414 that includes five separate candidate trajectories, in other examples, the ML system or planning component may determine any number of candidate trajectories.

Figure 4B:
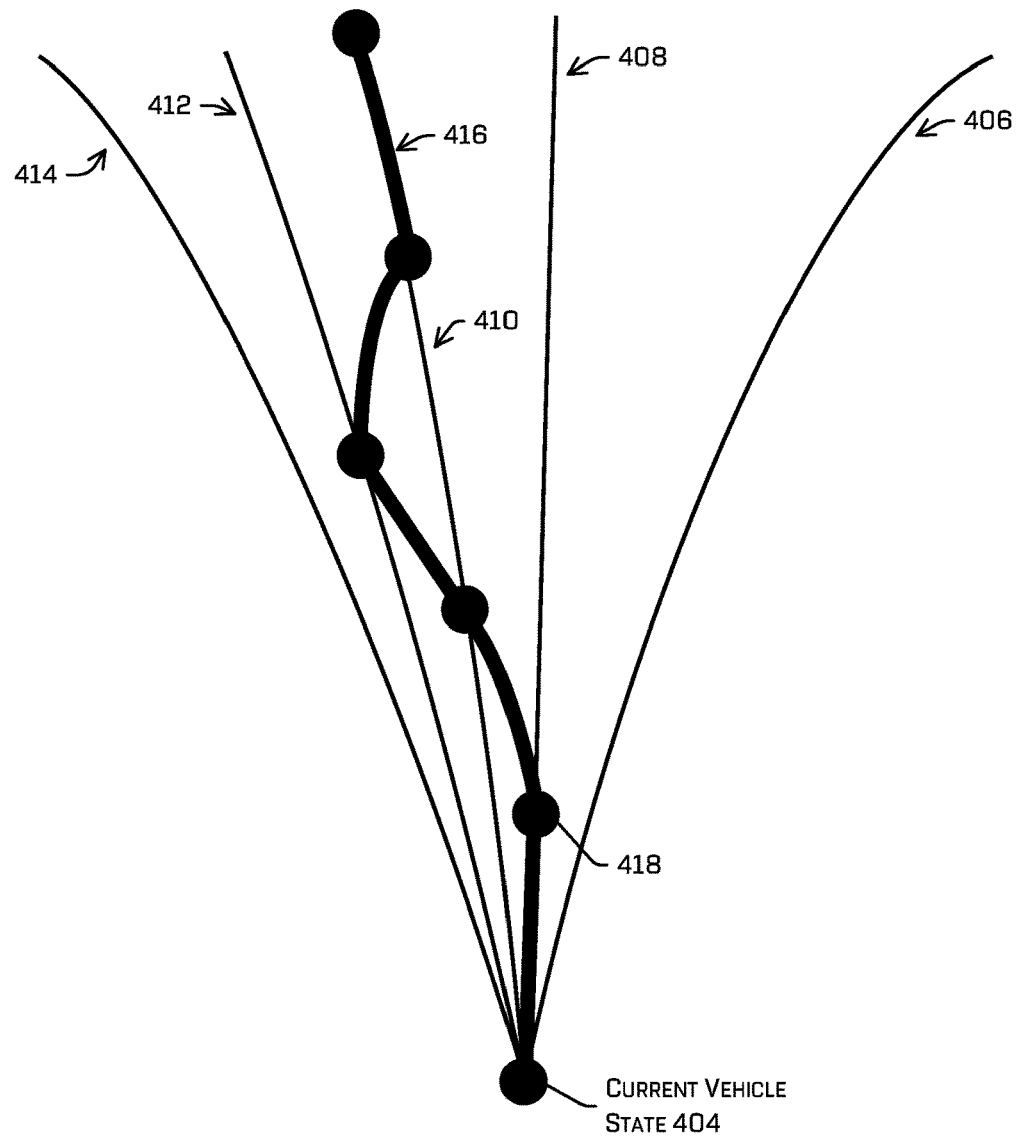
FIG. 4B illustrates an example representation of a control trajectory determined based on evaluating the candidate trajectories within the tree structure, in accordance with one or more examples of the disclosure.

FIG. 4B illustrates an example representation 400 of a control trajectory determined based on evaluating the candidate trajectories within the tree structure. In this example, the example representation 400 includes five different candidate trajectories. Such candidate trajectories may correspond to the candidate trajectories illustrated and described in FIG. 4A. As shown, the example representation 400 may include six different nodes representing vehicle states at six different action layers of the tree structure. In this example, FIG. 4B depicts the vehicle state 404 corresponding to the root node in a tree search. In some examples, the nodes may be spaced based on time. That is, the spacing between the nodes may be smaller or larger based on the amount of time between nodes. In some instances, the planning component may determine nodes with a uniform time gap from one node to another; however, in other examples the planning component may determine nodes with varying time gaps based on the distance the node is from the current vehicle state 404 (e.g., larger time gap for larger distance).

In some examples, a planning component may perform an optimization technique to determine a control trajectory 416 for the vehicle to follow. A control trajectory may include portions of one or more of the candidate trajectories and may result in a traversal path that has the lowest overall cost. Specifically, the planning component may evaluate candidate trajectories 406-414 from the first node (current vehicle state 404) to the second node 418. The planning component may determine which of the candidate trajectories has the lowest overall cost between such nodes. In this example, the planning component may determine that the candidate trajectory 408 has the lowest cost and as such, the planning component may determine that the portion of the candidate trajectory 408 between the first and second nodes is part of the control trajectory. Further, the planning component may perform similar operations for the second node. Specifically, the planning component may determine which candidate trajectory has the lowest cost from the second node. In this example, the planning component may determine that the candidate trajectory 410 may have the lowest cost between the second and third nodes and as such, the planning component may transition to the candidate trajectory 410. The planning component may perform similar operations at each node to build or otherwise generate the control trajectory 416.

Figure 5:
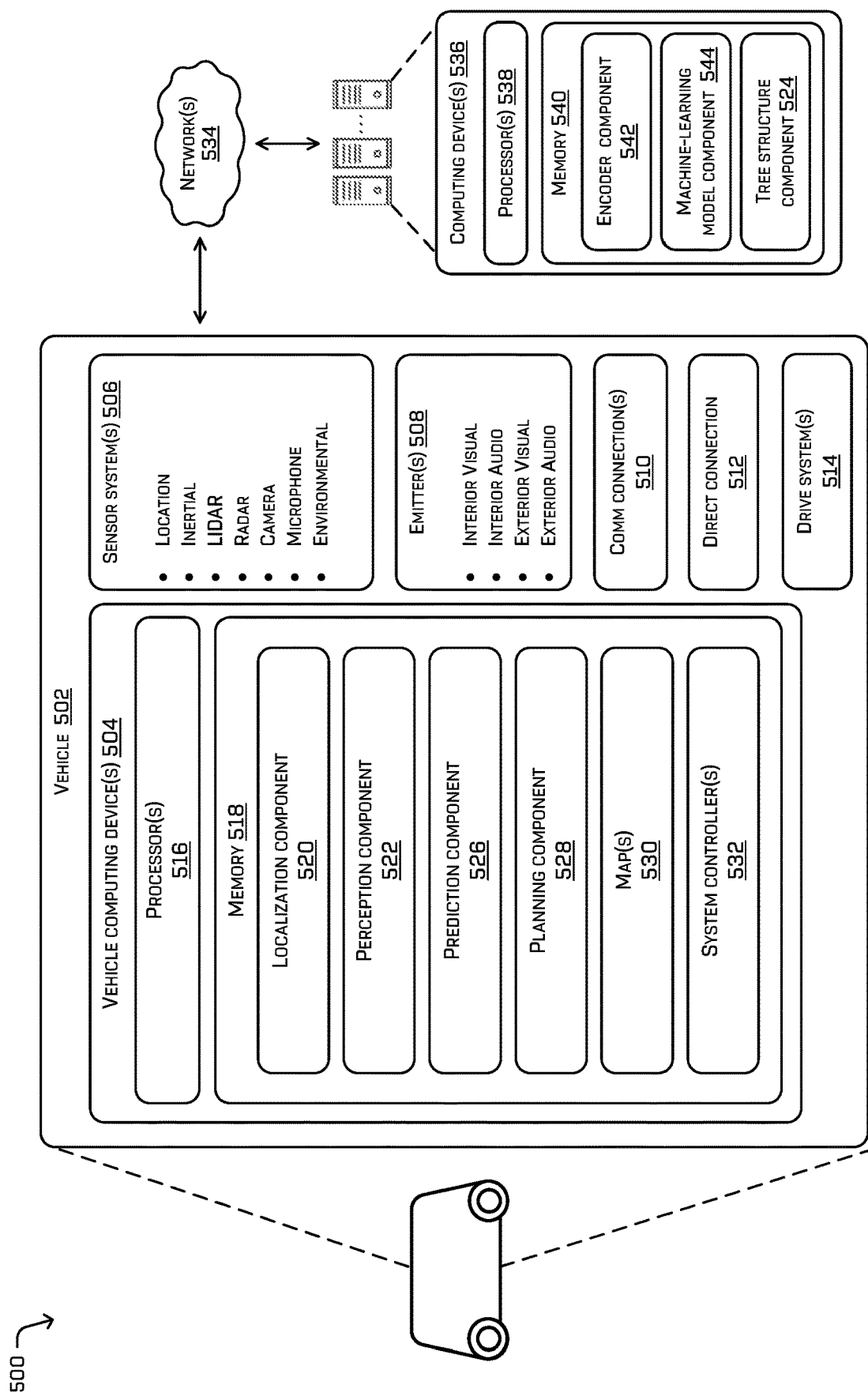
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include an encoder component 542, a machine-learning model component 544, and a tree structure component 524.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage.

The planning component 528 may also perform any of the techniques described with respect to any of FIGS. 1-4B above with respect to determining a control trajectory based on receiving a diverse set of learned candidate trajectories.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques s (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may an encoder component 524, a machine-learning model component 544, and a tree structure component 546. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the encoder component 524, the machine-learning model component 544, and the tree structure component 546 may perform substantially similar functions as the planning component 528.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
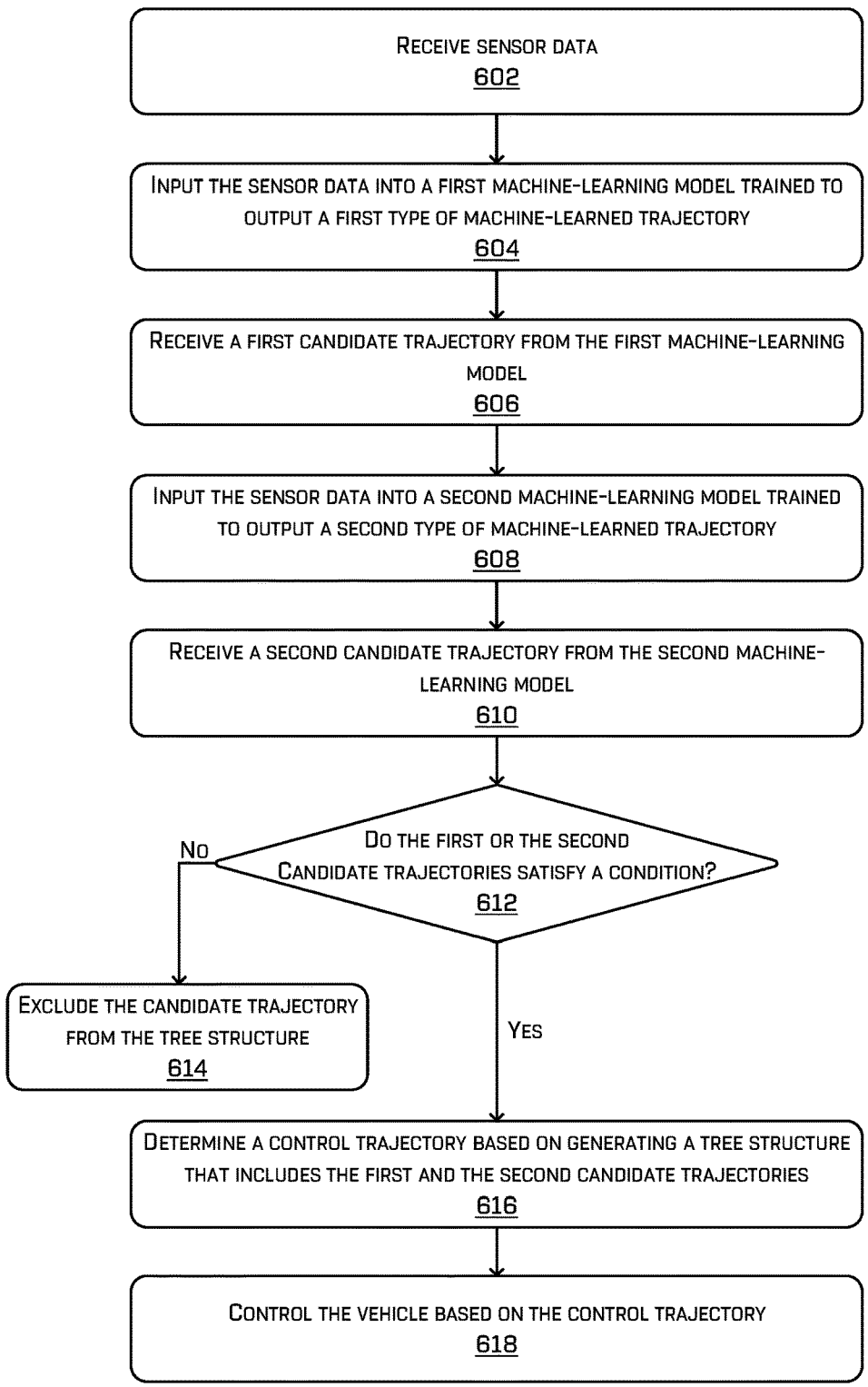
FIG. 6 is a flow diagram illustrating an example process of receiving sensor data, inputting the sensor data into a first machine-learning model and a second machine-learning model, receiving a first candidate trajectory from the first machine-learning model and a second candidate trajectory from the second machine-learning model, generating a tree structure based on the first and second candidate trajectories, and controlling the vehicle based on a control trajectory determined from the tree structure, in accordance with one or more examples of the disclosure.

FIG. 6 is a flow diagram illustrating an example process 600 of receiving sensor data, inputting the sensor data into a first machine-learning model and a second machine-learning model, receiving a first candidate trajectory from the first machine-learning model and a second candidate trajectory from the second machine-learning model, generating a tree structure based on the first and second candidate trajectories, and controlling the vehicle based on a control trajectory determined from the tree structure. As described below, the process 600 may be performed by one or more computer-based components configured to implement various functionalities described herein. For instance, some or all of the operations of process 600 may be performed by a planning component 202. As described above, a planning component 202 may be integrated as an on-vehicle system in some examples. However, in other examples, planning component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the ML component may receive sensor data. In some examples, the ML system may receive data relating to the vehicle mission. Specifically, the vehicle mission may indicate the start location(s), the end location(s) (e.g., destination location(s)), number of passengers, and/or any other data. Further, the ML system may receive data relating to the state of the vehicle. State information may include location data, pose data, velocity data, acceleration data, steering angle, yaw rates, and/or any other data. Additionally, the ML system can receive data from the perception and/or prediction systems. Specifically, the ML system may receive data representing one or more objects and the object's associated information and/or characteristics (e.g., object pose, object type, object velocity, object acceleration, etc.). In some examples, the ML system may also receive road feature information (e.g., number of lanes, type of lane, road signage, width of lane, etc.).

At operation 604, the ML system may input the sensor data into a first ML model trained to output a first type of ML trajectory. The ML system may encode the data and input such encoded data into an ML model. For example, the system may input the some or all the data into a single encoder configured to encode the data. Alternatively or additionally, the ML system may input each type of data into a corresponding encoder configured to encode the corresponding type of data. Such encoders may be a transformer model, a residual network (i.e., ResNet) model, and/or any other type of model. Example techniques for encoding data can be found, for example, in U.S. application Ser. No. 17/855,088, filed Jun. 30, 2022, and titled "Machine-Learned Component for Vehicle Trajectory Generation", as well as in U.S. application Ser. No. 18/072,015, filed Nov. 30, 2022, and titled "Vehicle Trajectory Tree Search for Off-Route Driving Maneuvers" the contents of which is herein incorporated by reference in its entirety and for all purposes. Upon encoding the various types of data, the ML system may input the encoded data into an ML model (e.g., Long Short-term Memory Networks ("LSTM")) trained to output a candidate trajectory for the vehicle to follow. Further, the ML model may be trained to output a specific type of trajectory that causes the vehicle to perform a certain type of action.

In some examples, the ML system may receive a probability corresponding to the candidate trajectory. For example, the ML system and/or ML model may determine a probability or rank corresponding to some or all of the candidate trajectories received from the ML models. The probability may represent how likely the candidate trajectory is to be selected or otherwise used by the vehicle. In some examples, the probability may be determined based on the data input to the ML models. For instances, the ML system may determine the probability based on the state of the vehicle, the object(s) located within the environment, the predicted data associated with the object(s), the mission goal for the vehicle, and/or any other factors. For example, if the data indicates that there is a double-parked vehicle located within the vehicle's path, the ML system may indicate that candidate trajectories which change lanes, stop, or pass the double parked vehicle have a higher probability of being used than a trajectory that instructs the vehicle to continue within the same lane. Conversely, if the data indicates that there are no objects located in the lane within which the vehicle is located, the ML system may indicate that the nominal trajectory that instructs the vehicle to continue in the same lane has a higher probability than candidate trajectories that cause the vehicle to change lanes.

At operation 606, the ML system may receive a first candidate trajectory from the first ML model. The ML system may receive a learned candidate trajectory. The types of candidate trajectories may include a nominal trajectory (e.g., default trajectory; proceed in the same lane), a left lane change trajectory, a right lane change trajectory, a passing trajectory, an aggressive trajectory, a passive trajectory, a combination of the various types of trajectories, and/or any other type of trajectory.

At operation 608, the ML system may input the data into a second ML model trained to output a second type of ML trajectory. In such examples, the ML system may input similar or identical encoded data to the second ML model as what was input to the first ML model. The second ML model may output a second candidate trajectory for the vehicle to follow. In some instances, the second candidate trajectory may instruct the vehicle to perform a different action than the first candidate trajectory. However, this example is not intended to be limiting, in other examples the ML system may input the encoded data into a single ML model which is trained to output multiple diverse candidate trajectories. In some examples, operations 604 and 606 may be performed simultaneously (in parallel) with operations 608 and 610.

At operation 610, the ML system may receive the second candidate trajectory from the second ML model. As noted above, the types of candidate trajectories may include a nominal trajectory (e.g., default trajectory; proceed in the same lane), a left lane change trajectory, a right lane change trajectory, a passing trajectory, an aggressive trajectory, a passive trajectory, a combination of the various types of trajectories, and/or any other type of trajectory. As noted above, in other examples the ML system may receive the second candidate trajectory from the first ML model.

At operation 612, the ML system may determine whether the first or second candidate trajectories satisfy a condition. The ML system may send candidate trajectories to be included in a tree search (e.g., tree structure) based on such candidate trajectories satisfying the condition. The condition may be a threshold for the probability of the candidate trajectory to meet or exceed. As such, the ML system may determine whether the first candidate trajectory and the second candidate trajectory satisfy the condition by determining whether the probability of the first candidate trajectory and the probability of the second candidate trajectory meet or exceed a threshold value. Filtering candidate trajectories based on probabilities may reduce the number of low-quality candidate trajectories in the tree structure while increasing the quality of trajectories in the tree structure, thereby reducing the computational expenses. If the ML system determines that the first or second candidate trajectory does not satisfy the condition (612: No), the ML system may exclude the candidate trajectory from the tree search. At operation 614, the ML system may determine to exclude the candidate trajectory from the tree structure based on the candidate trajectory failing to satisfy the condition. Further, the ML system may also exclude the learned candidate trajectory based on determining that the candidate trajectory is within a threshold level of similarity to an already generated candidate trajectory (learned or heuristic-based candidate trajectory).

In contrast, if the first or second candidate trajectories satisfy the condition (612: Yes), the ML system may send such candidate trajectories to be included in the tree structure. At operation 616, the ML system may determine a control trajectory based on generating a tree structure that includes the first and the second candidate trajectories. In some examples, the vehicle may generate a tree structure that includes some or all of the candidate trajectories. A tree structure may include one or more nodes representing vehicle states at different action layers of the tree structure. Further, each vehicle state may include multiple candidate trajectories which the vehicle may follow. In some examples, some or all of the candidate trajectories in the tree structure may be received from the ML system. Alternatively or additionally, some candidate trajectories in the tree structure may be heuristic-based trajectories generated by one or more components of the vehicle. As such, in some examples the tree structure may include a combination of learned and heuristic-based candidate trajectories.

In some examples, the vehicle can determine a control trajectory based on the tree structure. The vehicle can evaluate some or all of the candidate trajectories at each node when determining a control trajectory. A control trajectory may result in a series of nodes of the one or more candidate trajectories which, when traversed (e.g., move along and between differing candidate trajectories), results in an output trajectory having a lowest determined overall cost. A cost value can indicate the safety, risk, convenience, and/or efficiency of a candidate trajectory. For instance, a high cost value may indicate heightened degree of risk, danger, inconvenience, and/or inefficiency of the trajectory. In contrast, low cost values may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs, progress costs, debris cost, an exit cost, an approach cost, a space cost, a payment cost, a yaw cost, and/or any other type of cost. In such instances, the cost management component may combine the various costs into a single overall cost. Such costs may be weighted differently, and as such, different costs may affect the overall cost in different proportions. In some examples, the vehicle may determine to follow a control trajectory with the lowest overall cost compared to the overall costs of the other potential traversal paths between the candidate trajectories.

At operation 618, the ML system may control the vehicle based on the control trajectory. In some examples, the vehicle may follow the control trajectory while operating within the environment. Upon determining the control trajectory from the tree search, the vehicle may follow the control trajectory throughout the environment.

EXAMPLE CLAUSES

A: A system comprising: one or more processors; and one or more non-transitory computer-readable media storing computer-executable instructions that, when executed, cause the one or more processors to perform operations comprising: receiving, from a sensor associated with an autonomous vehicle, sensor data; determining, using a first machine learned model and based at least in part on the sensor data, an encoding; inputting the encoding into a second machine-learning model; receiving, from the second machine-learning model, a first candidate trajectory of a first type; receiving, from the second machine-learning model, a second candidate trajectory having a second type that is different from the first type; generating, based at least in part on the first candidate trajectory and the second candidate trajectory, a tree structure; determining a control trajectory for the autonomous vehicle, based at least in part on the tree structure; and controlling the autonomous vehicle based at least in part on the control trajectory.

B: The system of paragraph A, wherein determining the encoding is further based at least in part on: a state of the autonomous vehicle, a characteristic of an object within an environment, or a feature of a surface of a road.

C: The system of paragraph A, the operations further comprising: determining, based on a heuristic, a third candidate trajectory, wherein generating the tree structure is further based at least in part on the third candidate trajectory.

D: The system of paragraph A, wherein the second machine learned model is trained such that a difference between a first output trajectory and a second output trajectory meets or exceeds a threshold difference.

E: The system of paragraph A, wherein generating the tree structure is based at least in part on: a probability associated with the first candidate trajectory meeting or exceeding a threshold value.

F: One or more non-transitory computer-readable media storing instructions executable by one or more processors, wherein the instructions, when executed, cause the one or more processors to perform operations comprising: receiving, from a sensor associated with a vehicle, sensor data; determining, based at least in part on the sensor data, a representation of an environment; inputting the representation into a machine-learning model; determining, using the machine-learning model and based at least in part on the representation, a first candidate trajectory for the vehicle; determining, using the machine-learning model and based at least in part on the representation, a second candidate trajectory for the vehicle, wherein the second candidate trajectory differs from the first candidate trajectory by at least a threshold difference; generating, based at least in part on the first candidate trajectory and the second candidate trajectory, a tree structure; and determining a control trajectory for the vehicle, based at least in part on the tree structure.

G: The one or more non-transitory computer-readable media of paragraph F, wherein determining the representation is further based at least in part on one or more of: a state of the vehicle, a characteristic of an object within the environment, or a feature of a surface of a road.

H: The one or more non-transitory computer-readable media of paragraph F, the operations further comprising: determining, based at least in part on a heuristic, a third candidate trajectory, wherein generating the tree structure is further based at least in part on the third candidate trajectory.

I: The one or more non-transitory computer-readable media of paragraph F, wherein the first candidate trajectory is of a first type and the second candidate trajectory is of a second type, and wherein one or more of the first type or the second type are associated with one or more of: a lane change, a modified velocity, a modified acceleration, a modified pose within a current lane, or remaining in the current lane.

J: The one or more non-transitory computer-readable media of paragraph F, wherein generating the tree structure is based at least in part on a probability associated with the first candidate trajectory meeting or exceeding a threshold probability.

K: The one or more non-transitory computer-readable media of paragraph F, wherein the control trajectory comprises of a first portion of the first candidate trajectory and a second portion of the second candidate trajectory.

L: The one or more non-transitory computer-readable media of paragraph F, wherein the operations further comprising: controlling the vehicle based at least in part on the control trajectory.

M: The one or more non-transitory computer-readable media of paragraph F, wherein determining that the first candidate trajectory differs from the second candidate trajectory is based at least in part on comparing one or more of: a first steering angle of the first candidate trajectory and a second steering angle of the second candidate trajectory, a first velocity of the first candidate trajectory and a second velocity of the second candidate trajectory, or a first acceleration of the first candidate trajectory and a second acceleration of the second candidate trajectory.

N: A method comprising: receiving, from a sensor associated with a vehicle, sensor data; determining, based at least in part on the sensor data, a representation of an environment; inputting the representation into a machine-learning model; determining, using the machine-learning model and based at least in part on the representation, a first candidate trajectory for the vehicle; determining, using the machine-learning model and based at least in part on the representation, a second candidate trajectory for the vehicle, wherein the second candidate trajectory differs from the first candidate trajectory by at least a threshold difference; generating, based at least in part on the first candidate trajectory and the second candidate trajectory, a tree structure; and determining a control trajectory for the vehicle, based at least in part on the tree structure.

O: The method of paragraph N, wherein determining the representation is further based at least in part on one or more of: a state of the vehicle, a characteristic of an object within the environment, or a feature of a surface of a road.

P: The method of paragraph N, further comprising: determining, based at least in part on a heuristic, a third candidate trajectory, wherein generating the tree structure is further based at least in part on the third candidate trajectory.

Q: The method of paragraph N, wherein the first candidate trajectory is associated with a first type and the second candidate trajectory is associated with a second type, and wherein one or more of the first type or the second type are associated with one or more of: a lane change, a modified velocity, a modified acceleration, a modified pose within a current lane, or remaining in the current lane.

R: The method of paragraph N, wherein generating the tree structure is based at least in part on a probability associated with the first candidate trajectory meeting or exceeding a threshold probability.

S: The method of paragraph N, wherein the control trajectory comprises of a first portion of the first candidate trajectory and a second portion of the second candidate trajectory.

T: The method of paragraph N, wherein determining that the first candidate trajectory differs from the second candidate trajectory is based at least in part on comparing one or more of: a first steering angle of the first candidate trajectory and a second steering angle of the second candidate trajectory, a first velocity of the first candidate trajectory and a second velocity of the second candidate trajectory, or a first acceleration of the first candidate trajectory and a second acceleration of the second candidate trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving, from a sensor associated with an autonomous vehicle, sensor data;
determining, using a first machine learned model and based at least in part on the sensor data, an encoding;
inputting the encoding into a second machine-learning model;
receiving, from the second machine-learning model, a first candidate trajectory of a first type;
receiving, from the second machine-learning model, a second candidate trajectory having a second type that is different from the first type;
determining that both the first candidate trajectory and the second candidate trajectory meet or exceed a probability threshold;
generating, based at least in part on the first candidate trajectory and the second candidate trajectory meeting or exceeding the probability threshold, a tree structure;
determining a control trajectory for the autonomous vehicle, based at least in part on the tree structure; and
controlling the autonomous vehicle based at least in part on the control trajectory.

2. The system of claim 1, wherein determining the encoding is further based at least in part on:
a state of the autonomous vehicle,
a characteristic of an object within an environment, or
a feature of a surface of a road.

3. The system of claim 1, the operations further comprising:
determining, based on a heuristic, a third candidate trajectory,
wherein generating the tree structure is further based at least in part on the third candidate trajectory.

4. The system of claim 1, wherein the second machine-learning model is trained such that a difference between a first output trajectory and a second output trajectory meets or exceeds a threshold difference.

5. The system of claim 1, wherein the tree structure includes a plurality of nodes that are associated with the first candidate trajectory or the second candidate trajectory.

6. One or more non-transitory computer-readable media storing instructions executable by one or more processors, wherein the instructions, when executed, cause the one or more processors to perform operations comprising:
receiving, from a sensor associated with a vehicle, sensor data;
determining, based at least in part on the sensor data, a representation of an environment;
inputting the representation into a machine-learning model;
determining, using the machine-learning model and based at least in part on the representation, a first candidate trajectory for the vehicle;
determining, using the machine-learning model and based at least in part on the representation, a second candidate trajectory for the vehicle, wherein the second candidate trajectory differs from the first candidate trajectory by at least a threshold difference;
determining that both the first candidate trajectory and the second candidate trajectory meet or exceed a probability threshold;
generating, based at least in part on the first candidate trajectory and the second candidate trajectory meeting or exceeding the probability threshold, a tree structure; and
determining a control trajectory for the vehicle, based at least in part on the tree structure.

7. The one or more non-transitory computer-readable media of claim 6, wherein determining the representation is further based at least in part on one or more of:
a state of the vehicle,
a characteristic of an object within the environment, or
a feature of a surface of a road.

8. The one or more non-transitory computer-readable media of claim 6, the operations further comprising:
determining, based at least in part on a heuristic, a third candidate trajectory,
wherein generating the tree structure is further based at least in part on the third candidate trajectory.

9. The one or more non-transitory computer-readable media of claim 6, wherein the first candidate trajectory is of a first type and the second candidate trajectory is of a second type, and wherein one or more of the first type or the second type are associated with one or more of:
a lane change,
a modified velocity,
a modified acceleration,
a modified pose within a current lane, or
remaining in the current lane.

10. The one or more non-transitory computer-readable media of claim 6, wherein the control trajectory comprises of a first portion of the first candidate trajectory and a second portion of the second candidate trajectory.

11. The one or more non-transitory computer-readable media of claim 6, wherein the operations further comprising:
controlling the vehicle based at least in part on the control trajectory.

12. The one or more non-transitory computer-readable media of claim 6, wherein determining that the first candidate trajectory differs from the second candidate trajectory is based at least in part on comparing one or more of:

a first steering angle of the first candidate trajectory and a second steering angle of the second candidate trajectory,
a first velocity of the first candidate trajectory and a second velocity of the second candidate trajectory, or
a first acceleration of the first candidate trajectory and a second acceleration of the second candidate trajectory.

13. The one or more non-transitory computer-readable media of claim 6, wherein the tree structure includes a plurality of nodes that are associated with the first candidate trajectory or the second candidate trajectory.

14. A method comprising:
receiving, from a sensor associated with a vehicle, sensor data;
determining, based at least in part on the sensor data, a representation of an environment;
inputting the representation into a machine-learning model;
determining, using the machine-learning model and based at least in part on the representation, a first candidate trajectory for the vehicle;
determining, using the machine-learning model and based at least in part on the representation, a second candidate trajectory for the vehicle, wherein the second candidate trajectory differs from the first candidate trajectory by at least a threshold difference;
determining that both the first candidate trajectory and the second candidate trajectory meet or exceed a probability threshold;
generating, based at least in part on the first candidate trajectory and the second candidate trajectory meeting or exceeding the probability threshold, a tree structure; and
determining a control trajectory for the vehicle, based at least in part on the tree structure.

15. The method of claim 14, wherein determining the representation is further based at least in part on one or more of:
a state of the vehicle,
a characteristic of an object within the environment, or
a feature of a surface of a road.

16. The method of claim 14, further comprising:
determining, based at least in part on a heuristic, a third candidate trajectory,
wherein generating the tree structure is further based at least in part on the third candidate trajectory.

17. The method of claim 14, wherein the first candidate trajectory is associated with a first type and the second candidate trajectory is associated with a second type, and wherein one or more of the first type or the second type are associated with one or more of:
a lane change,
a modified velocity,
a modified acceleration,
a modified pose within a current lane, or
remaining in the current lane.

18. The method of claim 14, wherein the control trajectory comprises of a first portion of the first candidate trajectory and a second portion of the second candidate trajectory.

19. The method of claim 14, wherein determining that the first candidate trajectory differs from the second candidate trajectory is based at least in part on comparing one or more of:
a first steering angle of the first candidate trajectory and a second steering angle of the second candidate trajectory, a first velocity of the first candidate trajectory and a second velocity of the second candidate trajectory, or a first acceleration of the first candidate trajectory and a second acceleration of the second candidate trajectory.

20. The method of claim 14, wherein the tree structure includes a plurality of nodes that are associated with the first candidate trajectory or the second candidate trajectory.

\* \* \* \* \*